June 22, 1965  F. S. SILLARS ETAL  3,190,526
APPARATUS FOR SOLDERING CANS
Filed Dec. 19, 1961

United States Patent Office 3,190,526
Patented June 22, 1965

3,190,526
APPARATUS FOR SOLDERING CANS
Frederick S. Sillars, Beverly, and William G. Birch, Danvers, Mass., assignors, by mesne assignments, to Campbell Soup Company, Camden, N.J., a corporation of New Jersey
Filed Dec. 19, 1961, Ser. No. 160,507
7 Claims. (Cl. 228—35)

This invention relates to apparatus for soldering can bodies and more particularly to applicators for applying solder to the side seams of "tin" cans as they come from a bodymaker. A conventional method of forming a "tin" can body is to bend a sheet of metal into a tube and interlock its edges to form a side seam or longitudinal seam joint of interlocked layers. From the outside of the can, the body material adjacent the interlocked layers turns inwardly forming a narrow re-entrant groove extending lengthwise of the body. It is to these layers that solder must be applied to seal the joint.

One form of applicator for applying solder to the re-entrant grooves of side seams is disclosed in United States Letters Patent No. 3,000,338, which issued September 19, 1961, to Frederick S. Sillars, one of the present joint inventors. Another form of applicator is disclosed in an application for United States Letters Patent Serial No. 145,550, filed October 17, 1961, also in the name of Frederick S. Sillars, the first mentioned applicator being flexible and the latter being rigid.

The applicators disclosed in both the patent and application each project a very small diameter jet of molten solder directly into the grooves of the side seams. The diameters of the jets are no greater than the widths of the grooves whereby solder is applied only to the areas where it is needed, i.e., the groove and the interlocked layers. No solder is applied to the can bodies outside the groove where it would have to be removed or if allowed to remain, would be wasted.

The usual manner of presenting cans to soldering stations of all types is to move the can bodies along a predetermined path from the bodymaker with their side seams in substantial alignment. The means for moving the bodies usually comprises an endless chain having feed dogs engageable with the trailing edges of each can body. While the cans are generally closely spaced, a gap does exist between the trailing end of one can body and the leading end of the next adjacent body. Since the solder is continuously applied by either of the above-mentioned Sillars applicators in the form of a jet or stream and since there is a period when the gap between cans passes over the stream, it is possible for the solder to pass through the gap and either project into the trailing end of one can body or be scooped up by the leading end of the succeeding body. While it is acceptable under certain conditions to have a small amount of tightly adhered solder collected on the inner surface of a can (due for example to the passage of fluxed solder through the seams in the lapped areas), where the cans are to be used for foods and the like, it is a requirement that solder not be permitted to collect as loosely attached beads or pellets on the inner surface. This becomes even more critical in certain food cans which are internally lacquered and to which solder will not adhere well. One method of assuring that beading will not occur by solder being squirted or scooped up by the can bodies, is by equating the velocity of the solder to the velocity of the can bodies in a manner disclosed in detail in the above-identified Sillars application.

It is an object of this invention to provide an improved jet type applicator for applying solder to the side seams of moving can bodies in such manner that there is no possibility of solder being projected into or scooped up by the bodies as they pass the applicator regardless of the relative velocities of the solder and the bodies.

As explained in both the Sillars' patent and application, the solder trajectory issuing from an applicator orifice, upon reaching a certain length, begins to waiver and become disassociated and strikes a target area somewhat spasmodically. Therefore, it is necessary to maintain the trajectory of solder at a length less than at which waivering occurs, otherwise inaccurate delivery, as well as splashing within the inside surface of the cans, will occur.

Another object of the invention is to provide an improved jet type applicator for applying a stream of solder to the side seams of can bodies in such manner that there is no possibility of the stream waivering, splashing or becoming disassociated.

Still another object of this invention is to provide an improved projection type applicator for applying solder to the side seams of can bodies with an accurately controlled trajectory of solder which is longer than has heretofore been considered possible.

Still another object of this invention is to provide an improved projection type applicator for projecting solder to the side seams of moving can bodies with an accurately controlled solder trajectory to permit greater spacing between can bodies than heretofore has been considered possible with jet type applicators.

Both of the above-identified flexible and rigid Sillars' applicators rely upon engagement between the body of the applicator and the can to assure correct registration between their orifices and the re-entrant grooves of the seams. Without such engagement can bodies which approach the applicator radically out of line do not receive a uniformly accurate deposit of solder.

Still another object of this invention is to provide an improved projection type applicator for applying solder to the side seams of can bodies which does not rely upon engagement between the applicator body and the can to deliver uniformly accurate deposits of solder.

In accordance with these objects and as a feature of this invention, there is provided in a machine for soldering can bodies having a solder applicator of either the flexible or rigid type which projects solder from an orifice into the re-entrant grooves of the side seams of moving can bodies, a flexible solder conducting wire associated with the discharge orifice which yieldingly engages the grooves and receives the projected solder conducting it directly to the can bodies. The fluxed seams draw the solder by adhesion tension or the free energy of wetting and thence by the additional forces of capillary attraction into the gaps between the layers of body material contiguous therewith. However, when the spaces between can bodies pass over the point of application, the solder remains adhered to the wire by surface attraction and will not project into the spaces whereby it could be picked up by the open ends of the can bodies. It will be appreciated that the surface attraction between the solder and the unfluxed wire is less than the adhesion tension of the fluxed seams, whereby the solder will be drawn by the fluxed seams but will not otherwise leave the wire. By the use of the conducting wire the spaces between adjacent cans may be increased substantially over that which heretofore has been considered to be the maximum and the applicator body need not itself touch the seams.

The above and other features of the invention including various novel details of construction and combinations of parts will now be more particularly described with reference to the accompanying drawings and pointed out in the claims. It will be understood that the particular embodiment of the invention is shown by way of illustration only and not as a limitation of the invention. The principles and features of this invention may be employed in varied and numerous embodiments without departing from the scope of the invention.

Figure 1:
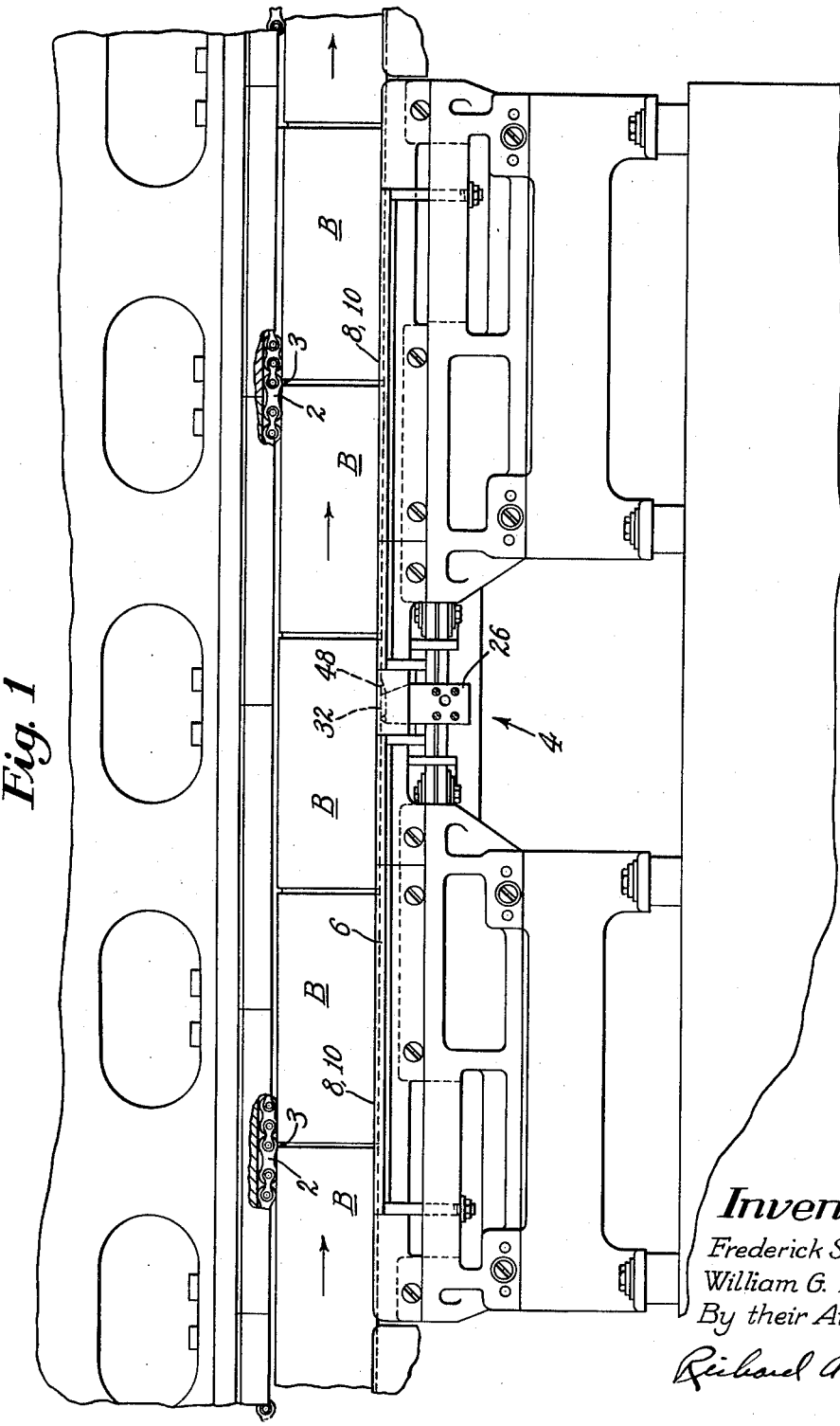
FIG. 1 is a side elevation of a can body soldering machine embodying the invention.

FIG. 1 shows "tin" can bodies B which were formed in a bodymaker of any conventional type, not illustrated, being moved from left to right in a timed and spaced order by a conveyor mechanism having an endless chain 2 with feed dogs 3 positioned at predetermined spaced intervals. Each dog 3 is engageable with the trailing edge of one can body. As shown, the leading edge of each body engages a feed dog, therefore, the spaces between adjacent bodies are equal to the length of the dogs. However, it will be understood that in practicing this invention it is possible to increase substantially the space between bodies as will become more apparent hereinafter.

The bodies B are conveyed past a soldering station 4 in which the subject matter of this invention is embodied. Prior to reaching the soldering station, the can bodies are heated by any convenient means, as for example, by an induction heater 6, which forms no part of the invention. The bodies are supported on spaced parallel guide rails 8 and 10 extending horizontally lengthwise of the machine. The bodies are slightly compressed between the upper surfaces of the guide rails 8 and 10 and the conveyor chain 2 since, in the illustrative machine, there is no internal mandrel present. Accordingly, the bodies are free to yield and flex somewhat as they pass the soldering station 4.

Figure 5:
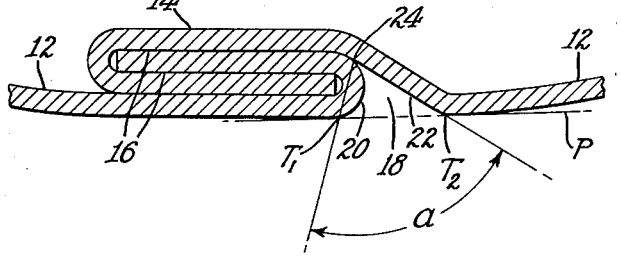

A representative example of an ideal interlocking side seam of a "tin" can is shown in cross section in FIG. 5 on a scale of approximately 20 to 1. While side seams vary somewhat one from another depending on their accuracy of manufacture, the representative seam, shown in FIG. 5, reflects the ideal interlocked seam of the entire range of can sizes from the smallest 2" mushroom can through gallon size. The seams do not generally vary substantially with the size of the can. The edges of the can body material 12 are interlocked as shown at 14 to form a side seam or seam joint comprising four superposed layers with almost imperceptible gaps 16 between layers. The best quality soldering occurs when solder flows through the gaps 16, to which flux has previously been applied, to form a virtual film of solder in engagement with the layers of the can material. The side seam also includes a longitudinal seam groove or indentation 18 leading to the interlocked portion 14. The indentation 18 extends parallel to the axis of the can and is defined laterally by a re-entrant angle $a$ located in the can body surface. The outer extent of the re-entrant groove or indentation is defined by a line or plane P engaging the body material 12 on both sides of the groove at points of tangency $T_1$, $T_2$. The re-entrant groove includes side walls 20, 22 coming together at an apex 24 leading into the superposed and interlocked portion 14 of the seam. This representative ideal side seam has the following approximate dimensions: The distance between the point of tangency $T_1$, $T_2$ is in the order of magnitude of .05" and the depth of the groove from the line of tangency to the apex 24 is in the order of magnitude .03". The re-entrant angle $a$ is approximately 75°.

Lap seams, as well as the interlocked seam illustrated here, are usually constructed with re-entrant grooves. Because the illustrated side seam is representative of seams on the entire range of can sizes of both the lap and interlock types and since even sizes above one gallon employ a seam of similar configuration, the principles of this invention pertain to virtually all cans regardless of their size and the gage of the material from which they are made.

To assure that beading will not occur by solder being projected into or scooped up by the can bodies, the velocity and the components of force of the solder trajectory relative to the velocity of the cans may be controlled within limits as taught in the above-indentified Sillars application. It is necessary, however, that the spaces between adjacent cans, as seen in FIG. 1, be relatively small. However, by the use of a solder applicator made in accordance with the present invention, which will be described in detail hereinafter, the lengths of the spaces may be appreciably increased with an assurance that solder will not rise to a point where it can either project into the trailing end of one can body or be scooped up by the leading end of the successive body. Also with the present applicator, the limits of solder velocity and force component are no means as critical as without it.

Figure 2:
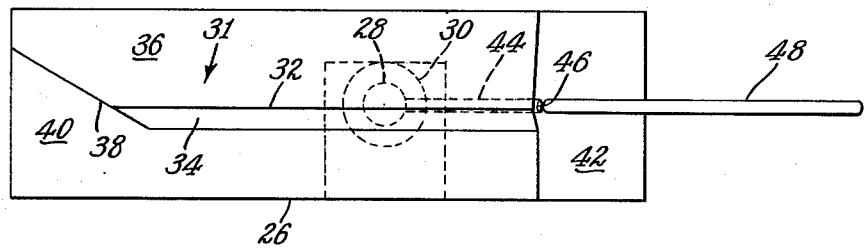
FIG. 2 is a plan view, on an enlarged scale, of a solder applicator embodying the invention.
Figure 3:
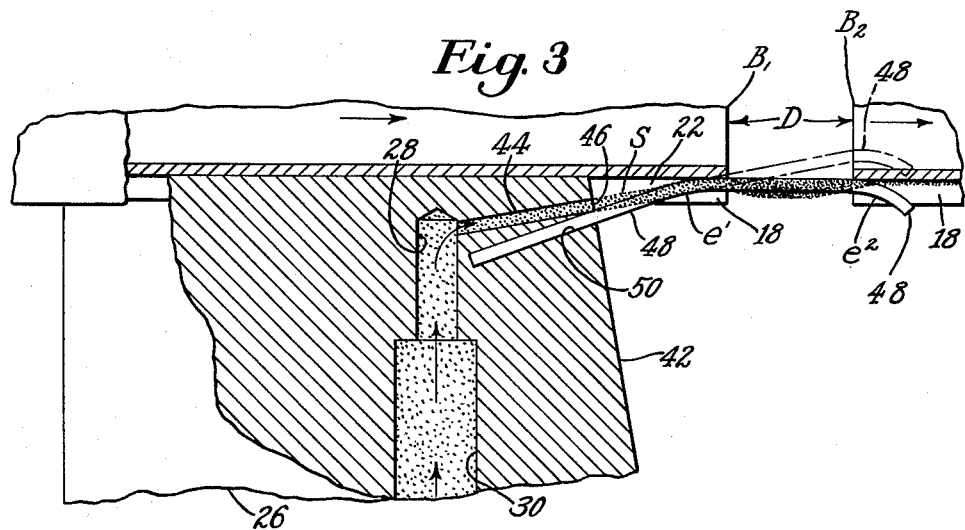
FIG. 3 is a side elevation, partly in section, of the applicator shown in FIG. 2 and of can bodies being soldered thereby.
Figure 4:
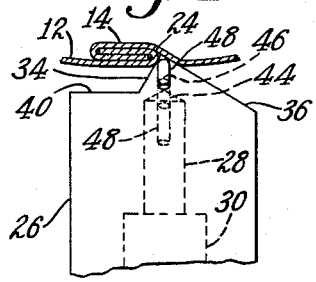
FIG. 4 is a front end view of the applicator shown in FIG. 2 including a sectional portion of a can body; and, FIG. 5 is a sectional view on a substantially enlarged scale of a representative ideal interlocking side seam of a "tin" can.

The invention will now be described as embodied in a rigid body solder applicator of the general type disclosed in the above-identified Sillars application. However, it will be understood that the invention may be embodied equally as well in a flexible applicator of the type disclosed in the Sillars Patent No. 3,000,338 or in any other projection or jet type applicator which projects solder to a seam. Referring to FIGS. 2 to 4, the illustrative applicator comprises a rigid body or nozzle 26 of ceramic or metal and includes a vertical two diameter passageway or bore 28 the larger or lower end 30 of which communicates with a solder feeding mechanism, not shown, but of the type described in detail in the above-identified Sillars patent. The applicator is adjustable toward and away from the path of travel both horizontally and vertically by adjusting means disclosed in detail in the above-identified Sillars patent and application. The upper portion of the nozzle 26 includes an angular seam engaging guide 31 having a ridge or crest 32 formed by sloping side surfaces 34 and 36 which extend upwardly from a horizontal surface 40. The guide is shaped and oriented to enter the grooves of the side seams of the traveling can bodies to guide them accurately over the applicator in the manner explained in the above-identified Sillars application.

The left-hand portion of the illustrative nozzle includes a camming surface 38 intersecting the surfaces 34 and 36, as well as the horizontal surface 40 from which the guide 31 rises. The surface 38 engages the leading edge of a can body to cam or otherwise move it into desired orientation relatively to the guide 31 and to a solder discharging passageway 44 which leads from the bore 28. The passageway 44 intersects a surface or face 42 at the right-hand side of the nozzle. The intersection of the passageway 44 and the surface 42 forms a solder discharge orifice 46 from which molten solder projects toward the re-entrant groove of the traveling can bodies.

Extending upwardly to the right from the surface 42 of the applicator 26 is a thin, flexible, solder conducting wire 48. The wire is attached to the applicator 26 by being forced into a bore 50 angularly disposed relative to the passageway 44. It will be obvious that the wire may be secured in any other convenient manner, as for example, by being welded to the surface 42. The wire 48 projects from the face 42 of the applicator 26 from just below the orifice 46 whereby the wire touches the bottom of the orifice. While this orientation of the wire relative to the orifice is the preferred form of the invention, it will be obvious that the wire may project from above the orifice or from points laterally thereof. In any case, the wire is located so that it intersects the projecting stream of solder S coming from the orifice 46.

The diameter of the wire 48, while being of the same order of magnitude as the diameter of the orifice 46, need not necessarily be as large or as small. The upper permissible limit of the wire's diameter is, however, equal to the width of the re-entrant groove of the seams, i.e., the distance between the points $T_1$ and $T_2$ as shown in FIG. 5. This is to assure that the solder on the surface of the wire will not touch the can body on the sides of the groove. The flexible wire 48 extends upwardly and outwardly from the applicator 26 so that when no can is present it occupies the phantom line position shown in FIG. 3, i.e., with its highest point above the level of the groove 18.

When a can body $B_1$, which is moving from left to right, reaches the position shown in FIG. 3, its leading edge deflects the wire downwardly into the solid line position with the wire firmly but yieldably engaging the interior surfaces 20 and 22 of the re-entrant groove 18 close to the apex 24, as shown in FIG. 4.

As the solder emerges from the orifice 46, it engages the fixed end of the wire 48 and its horizontal component of force causes it to pass to the right along the wire toward its free end. However, the surface attraction between the solder and the wire is greater than the upward vertical component of force tending to cause the solder to leave the wire and project above the level of the seam. The surface attraction is also greater than gravitational force tending to cause the solder to drip from the wire. As the can body $B_1$ moves across the wire, the adhesion tension or free energy of wetting of the fluxed seam plus the additional force of capillary attraction into the gaps 16 between the layers of body material, being greater than surface attraction between the solder and the wire, draws the solder from the wire toward the apex 24 of the re-entrant groove and thence into the superposed layers 16.

As the can body $B_1$ moves to the right, as viewed in FIG. 3, its trailing end will eventually occupy the position of the can $B_2$, the stronger adhesion tension forces of the fluxed seam plus capillary attraction still drawing the solder into the seam until it is completely soldered. It will be noted, however, that the solder will evidence a tendency in advance of this point to accumulate on the lower side of the wire 48 due to gravitational forces but it will not fall from the wire because of its surface attraction with the wire and the upward pulling effect of the fluxed seam. As the preceding can occupies the position indicated as $B_2$, a subsequent can body moves into the position indicated as $B_1$. The length of the seam engaging portion $e^1-e^2$ of the wire 48 is greater than the distance D between can bodies so that at all times at least one can body is in engagement with the wire holding it in the solid line position. Accordingly, at no time except when the first can of a day's run approaches the wire is the wire and the solder adhering to it higher than the inside level of the seams. The surface attraction between the solder and the wire assures that the solder will not project above or leave the wire. Therefore, there is no possibility for solder to project into the trailing end of the body $B_2$ or be scooped up by the leading end of the body $B_1$. This is true regardless of the variations between the horizontal velocity of the solder moving along the wire and the velocity of the traveling can bodies.

Another resulting advantage in using the conducting wire is that the distance D between can bodies can be appreciably increased over that possible without the wire, as for example, by increasing the distance between feed dogs 3 on the chain 2 whereby the leading end of a can would then not touch the trailing end of each feed dog. Furthermore, a shorter size can may be conveyed by the chain 2 without changing the number or location of its dogs 3.

The invention is herein shown for illustrative purposes embodied in an applicator of the type disclosed in the above-identified Sillars application, i.e. one having a rigid body with a guide 31 engageable with the re-entrant grooves of the side seams of the can bodies to maintain them in accurate alignment with its orifice. It will be appreciated that physical engagement between the applicator body and the seams of the cans is not necessary with the illustrative applicator or any other applicator made in accordance with this invention. For example, the illustrative applicator may be lowered so that the guide 31 does not engage the re-entrant grooves of the can bodies since the conducting wire 48 will maintain contact with the grooves. Being flexible, the wire will move vertically and horizontally to remain, at all times, in engagement with the sides 20, 22 of the grooves in the closest possible relationship to the apex 24. An advantage of this feature is that bodies which approach the applicator with their side seams out of exact alignment but within the normal predicted path of the seams will receive the same uniformly accurate deposit of solder as all others since delivery of the solder is controlled by the conducting wire.

Having thus described our invention, what we claim as new and desire to secure by Letters Patent of the United States is:

1. An applicator for soldering the side seams of can bodies moving in a predetermined path comprising a flexible solder conducting wire engageable along its length intermediate its ends with the seams of the bodies, a nozzle for projecting a stream of solder onto the surface of the wire along which the solder travels to be engaged by the bodies, and means for mounting the applicator with the initial position of said flexible wire intersecting the path of travel of the side seams so that the wire will upon contact flex and remain yieldingly engaged with said side seams.

2. An applicator for soldering the side seams of can bodies moving in a predetermined path comprising a flexible solder conducting wire having a fixed end and a free end engageable along its length intermediate its ends with the seams of the bodies, a nozzle for projecting molten solder onto the wire adjacent its fixed end and toward the free end whereby the solder travels along the wire to be engaged by the moving bodies, and means for mounting the applicator with the initial position of said flexible wire intersecting the path of travel of the side seams so that the wire will upon contact flex and remain yieldingly engaged with the side seams.

3. An applicator for applying solder to the side seams of can bodies moving in a predetermined path comprising a body portion having an orifice for discharging molten solder, a flexible solder conducting wire extending from the body portion onto which wire the solder is discharged, and means for mounting said applicator in order that said flexible wire engages the side seams of the can bodies along its length intermediate its ends to conduct the solder to the bodies.

4. An applicator for applying solder to the side seams of can bodies moving in a predetermined path comprising a body portion having an orifice for discharging molten solder, a flexible solder conducting wire extending from the body portion from adjacent the orifice in a direction to intersect the path of solder discharged from the orifice, and means for mounting said applicator in order that said flexible wire engages the side seams of the can bodies along its length intermediate its ends to conduct the solder to the bodies from the orifice.

5. In a machine for soldering the side seams of moving can bodies, means for moving the bodies along a predetermined path of travel with their side seams in substantial alignment, a solder applicator including a body portion having an orifice for discharging molten solder and a flexible solder conducting wire extending from the body onto which the solder is discharged, said wire being engageable along its length intermediate its ends with the side seams of the can bodies, said applicator being mounted in the machine with the initial position of said wire intersecting the path of travel of the side seams so that said wire will contact and remain yieldingly engageable with the side seams to conduct solder thereto.

6. In a machine for soldering the side seams of moving can bodies, means for moving the bodies along a predetermined path of travel in spaced relationship with their side seams in substantial alignment, a solder applicator including a body portion having an orifice for discharging molten solder and a flexible solder conducting wire onto which the solder is discharged, said applicator being mounted in the machine with the initial position of said wire in the path of travel of the side seams so that said wire will contact and remain yieldingly engageable with the side seams to conduct solder thereto, said wire having a seam engaging portion which is longer than the distance between adjacent can bodies measured in their direction of movement, whereby at least one body is always in engagement with said wire.

7. In a machine for soldering the side seams of moving can bodies each of which has a seam joint including a re-entrant groove, means for moving the bodies along a predetermined path of travel with their side seams in substantial alignment, a solder applicator including a body portion having an orifice for discharging molten solder and a flexible solder conducting wire onto which the solder is discharged, said wire having a diameter no greater than the width of the side seam groove, said wire being engageable along its length intermediate the ends with the re-entrant grooves of the seam joints, said applicator being mounted in the machine with the initial position of said wire in said path of travel and so that said wire will contact and remain yieldingly engageable with the re-entrant grooves and conduct solder thereinto.

References Cited by the Examiner
FOREIGN PATENTS 597,477    1/48    Great Britain.

CHARLES W. LANHAM, *Primary Examiner.*

NEDWIN BERGER, *Examiner.*